United States Patent
Hotta et al.

(10) Patent No.: US 9,469,201 B2
(45) Date of Patent: Oct. 18, 2016

(54) VEHICLE EQUIPMENT MOUNTING STRUCTURE

(75) Inventors: Koji Hotta, Miyoshi (JP); Kenshi Yamanaka, Okazaki (JP); Yutaka Hotta, Chiryuu (JP)

(73) Assignees: TOYOTA JIDOSHA KABUSHIKI KAISHA, Toyota-Shi (JP); AISIN AW CO., LTD., Anjo-Shi (JP)

( * ) Notice: Subject to any disclaimer, the term of this patent is extended or adjusted under 35 U.S.C. 154(b) by 597 days.

(21) Appl. No.: 13/982,618

(22) PCT Filed: Feb. 2, 2012

(86) PCT No.: PCT/IB2012/000185
§ 371 (c)(1),
(2), (4) Date: Jul. 30, 2013

(87) PCT Pub. No.: WO2012/104721
PCT Pub. Date: Aug. 9, 2012

(65) Prior Publication Data
US 2013/0307330 A1    Nov. 21, 2013

(30) Foreign Application Priority Data
Feb. 3, 2011 (JP) ................... 2011-021314

(51) Int. Cl.
*B60L 1/00* (2006.01)
*B60L 11/18* (2006.01)
(Continued)

(52) U.S. Cl.
CPC ................. *B60L 11/18* (2013.01); *B60K 1/04* (2013.01); *B60R 16/04* (2013.01); *B60K 2001/0411* (2013.01)

(58) Field of Classification Search
CPC . B60K 1/04; B60K 2001/0411; B60L 11/18; B60R 16/04
USPC ......................................... 307/10.1
See application file for complete search history.

(56) References Cited

U.S. PATENT DOCUMENTS 6,827,168 B2 * 12/2004 Miyazaki ............... B60R 19/00
                                                180/274
8,485,292 B2 * 7/2013 Wakatsuki ............ B60K 11/02
                                                123/41.44

(Continued)

FOREIGN PATENT DOCUMENTS

JP    2001-354040 A    12/2001
JP    2002225750 A     8/2002

(Continued)

*Primary Examiner* — Jared Fureman
*Assistant Examiner* — Duc M Pham
(74) *Attorney, Agent, or Firm* — Kenyon & Kenyon LLP

(57) ABSTRACT

A vehicle equipment mounting structure that arranges a motor case, in which a rotary electric machine that drives a vehicle is housed, in an engine compartment, and that includes a PCU that controls the rotary electric machine, and an auxiliary battery that supplies electric power to the PCU. This structure includes a fixing portion that fixes the PCU onto the motor case, and a connecting portion that connects the auxiliary battery to a side member that absorbs an impact load by being crushed in a crushing direction. The connecting portion has a displaceable member that is displaceable in the crushing direction. The auxiliary battery is arranged on a vehicle front side of the PCU such that the PCU and the auxiliary battery partially overlap in the crushing direction. The auxiliary battery is arranged so as to be able to move past the PCU in response to an impact load.

14 Claims, 7 Drawing Sheets

(51) Int. Cl.
*B60K 1/04* (2006.01)
*B60R 16/04* (2006.01)

(56) References Cited

U.S. PATENT DOCUMENTS

2002/0191385 A1 12/2002 Miyazaki
2010/0116571 A1 5/2010 Suzuki

FOREIGN PATENT DOCUMENTS

| JP | 2002-362254 A | 12/2002 |
| JP | 2009154757 A | 7/2009 |
| JP | 2010-158991 A | 7/2010 |
| JP | 2012-144227 A | 8/2012 |
| WO | 2009028520 A1 | 3/2009 |

* cited by examiner

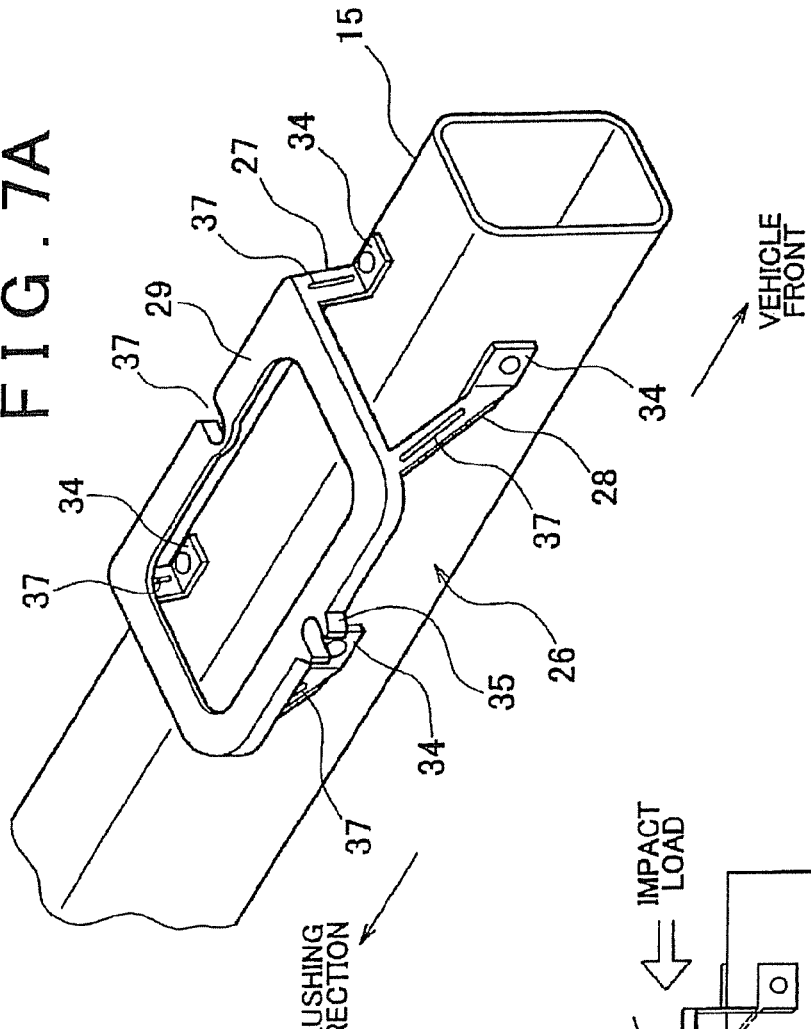
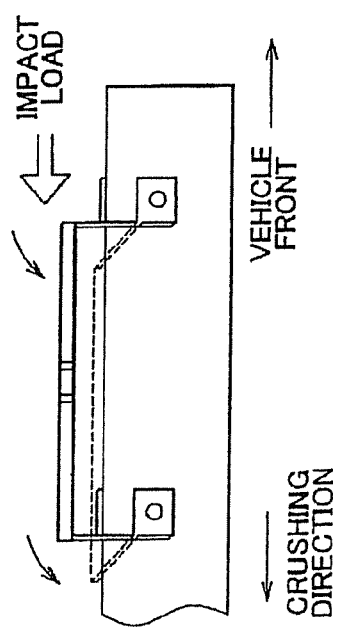

VEHICLE EQUIPMENT MOUNTING STRUCTURE

CROSS REFERENCE TO RELATED APPLICATION

This is a national phase application based on the PCT International Patent Application No. PCT/IB2012/000185 filed on Feb. 2, 2012, claiming priority to Japanese Patent Application No. 2011-021314 filed on Feb. 3, 2011, the entire contents of both of which are incorporated herein by reference.

BACKGROUND OF THE INVENTION

1. Field of the Invention

The invention relates to a vehicle equipment mounting structure that arranges a motor case, in which a rotary electric machine that drives a vehicle is housed, in a compartment provided forward of a vehicle cabin, and that mounts a power control apparatus that controls the rotary electric machine, and an auxiliary battery that supplies electric power to a control portion of the power control apparatus.

2. Description of Related Art

Electric vehicles in which the vehicle is driven by driving force from a rotary electric machine such as a motor-generator, hybrid vehicles in which the vehicle is driven by a combination of a rotary electric machine and an engine that is an internal combustion engine, and fuel cell vehicles in which the vehicle is driven by electric power generated by a fuel cell, and the like are known. These kinds of vehicles are equipped with a power control apparatus that receives a supply of electric power from a main battery or a fuel cell, and has a step up converter and inverter and the like that control the electric power to a motor-generator (hereinafter, also referred to as "motor").

The power control apparatus is also referred to as a PCU (power control unit), and must be mounted in an engine compartment that is close to the motor-generator in order to handle the high voltage and high current. Therefore, in a hybrid vehicle in which the engine is started by the motor-generator, an auxiliary battery for starting the engine is arranged in the luggage compartment because it does not need to be arranged near the engine, as well as for reasons related to space in the engine compartment. In recent years, high-voltage equipment is being made smaller and smaller, so the auxiliary battery is now able to be arranged inside the engine compartment and near the power control apparatus. As a result, a cable that had to be brought around to the luggage compartment can be reduced, thereby enabling both weight and cost to be reduced.

However, when the auxiliary battery is arranged near the power control apparatus, it is preferable to avoid interference between the auxiliary battery and power control apparatus in order to quickly and efficiently protect and rapidly discharge the power control apparatus when the vehicle is involved in a collision. Also, although there would be little harm from damage to the auxiliary battery because it is a relatively low voltage of only 12 volts, it is desirable to keep damage to the electric power apparatus that controls high voltage of several hundred volts to a minimum.

Therefore, technology described in Japanese Patent Application Publication No. 2002-362254 (JP-A-2002-362254) has a detachable mechanism in which, when the vehicle is involved in a collision, a relay box moves upward and detaches from a vehicle body in response to a load transmitted from an auxiliary battery via a guide surface when the auxiliary battery moves to the rear as a result of a barrier (i.e., an obstacle) penetrating the vehicle. The battery moves smoothly toward the rear by this mechanism. Providing this kind of detachable structure for the relay box makes it possible to improve the impact absorption performance by preventing interference between vehicle equipment and other members that move by the impact of a collision. Japanese Patent Application Publication No. 2010-158991 (JP-A-2010-158991) describes an equipment mounting structure that mounts a front end of a power control apparatus in a position farther back toward the rear of the vehicle than a front end of a motor case, and that arranges an electric compressor on the vehicle rear side of the power control apparatus, in order to protect the power control apparatus itself when the vehicle is involved in a collision.

With the structure described in JP-A-2002-362254 and JP-A-2010-158991, the auxiliary battery is able to be mounted using the space created in front of the motor case, by arranging the detachable structure and the power control apparatus in a location farther back on the motor case toward the rear of the vehicle. However, with a structure in which the auxiliary battery is arranged in front of the motor case, it is necessary to provide a detachable structure that safely moves the power control apparatus that is positioned to the vehicle rear of the auxiliary battery in order to protect and enable rapid discharge of the power control apparatus when the vehicle is involved in an collision, which leads to an increase in cost.

SUMMARY OF THE INVENTION

The invention thus provides a vehicle equipment mounting structure that moves an auxiliary battery toward the rear past a power control apparatus, without the auxiliary battery that is arranged near the power control apparatus interfering with the power control apparatus when there is a collision.

On aspect of the invention thus relates to a vehicle equipment mounting structure. This vehicle equipment mounting structure arranges a motor case, in which a rotary electric machine that drives a vehicle is housed, in a compartment provided forward of a vehicle cabin, and mounts a power control apparatus that controls the rotary electric machine, and an auxiliary battery that supplies electric power to a control portion of the power control apparatus. This vehicle equipment mounting structure has a fixing portion that fixes the power control apparatus onto the motor case, and a connecting portion that connects the auxiliary battery to a vehicle frame member that absorbs an impact load by being crushed in a crushing direction. The connecting portion includes a displaceable member that is displaceable in the crushing direction. The auxiliary battery is arranged on a vehicle front side of the power control apparatus such that the power control apparatus and the auxiliary battery partially overlap in the crushing direction, and the auxiliary battery is arranged so as to be able to move past the power control apparatus in response to the impact load.

Also, in the vehicle equipment mounting structure according to this aspect of the invention, the connecting portion may connect the auxiliary battery to the vehicle frame structure such that a front end portion of the auxiliary battery is farther toward the vehicle front side than a front end portion of the power control apparatus is. With this kind of arrangement, the auxiliary battery will absorb the impact before the power control apparatus does, so damage to the power control apparatus can be reduced.

A portion of the auxiliary battery may be arranged by the connecting portion so as to be positioned next to a side of the power control apparatus. With this kind of arrangement, the auxiliary battery is able to move without losing its posture, by being guided to the side of the power control apparatus.

Also, the connecting portion may be able to move in the crushing direction by displacement of the displaceable member, and may move the auxiliary battery without inhibiting the vehicle frame member from being crushed by the impact load. In this way, the connecting portion is able to move the auxiliary battery by displacement due to crushing of the vehicle frame member and the displacement of the connecting portion itself.

Also, the connecting portion may be connected to the vehicle frame member by the displaceable member in at least two locations. Because the auxiliary battery is connected to the displaceable member of the connecting portion, the vehicle frame member is not inhibited from being crushed.

The power control apparatus and the auxiliary battery may be arranged in this order from a center in a vehicle width direction toward an outside in the vehicle width direction. With this kind of arrangement, when there is an offset collision, the auxiliary battery absorbs the impact before the power control apparatus does, so damage to the power control apparatus can be reduced.

Furthermore, the motor case may be a double axis type transaxle with two rotary electric machines. The double axis type transaxle has a predetermined dimension in the vehicle longitudinal direction, so the power control apparatus is easily mounted on the transaxle.

Using the vehicle equipment mounting structure according to the aspect of the invention enables the power control apparatus to be arranged on the motor case, and the auxiliary battery to be arranged on a side member of a vehicle frame member so that it partially overlaps in the vehicle longitudinal direction with the power control apparatus. This mounting structure enables the space in the engine compartment to be utilized. Also, when there is a collision, a barrier penetrates the engine compartment while crushing the vehicle frame member and the support of the auxiliary battery. Consequently, the auxiliary battery moves past the power control apparatus such that the auxiliary battery does not interfere with the power control apparatus. As a result, the power control apparatus is able to be protected and can be rapidly discharged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a perspective view of a support that supports an auxiliary battery according to another example embodiment of the invention; and FIG. 7B is a view of deformation of the support when an impact load is applied.

DETAILED DESCRIPTION OF EMBODIMENTS

Hereinafter, example embodiments of the invention will be described in detail with reference to the accompanying drawings.

Figure 1:
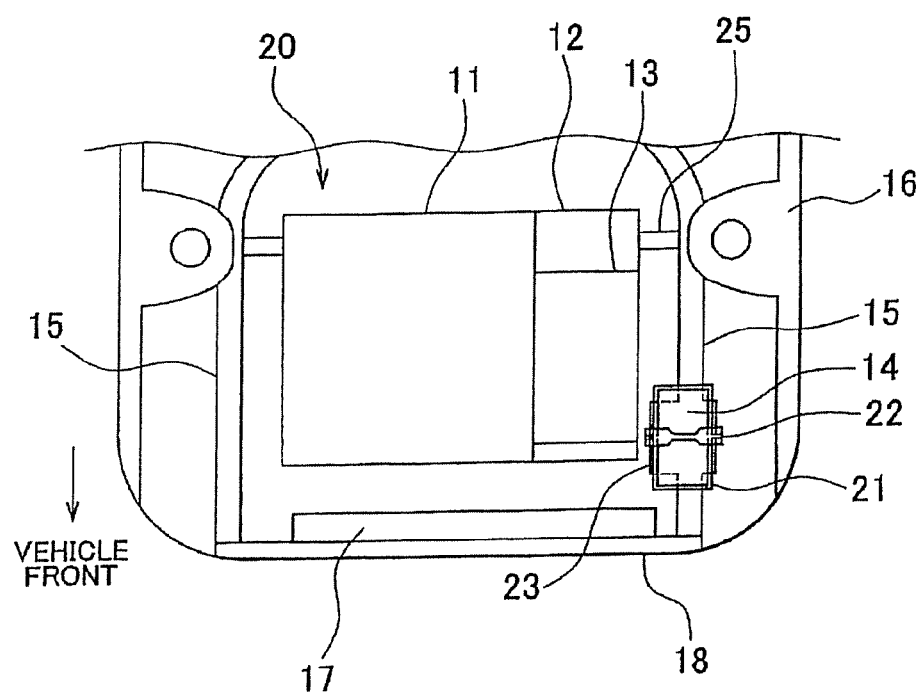
FIG. 1 is a top view of an engine compartment showing a vehicle equipment mounting structure according to one example embodiment of the invention.

FIG. 1 is a view of an engine compartment 20 of a hybrid vehicle 10, and a vehicle equipment mounting structure for a PCU 13 that is arranged on an upper surface of a motor case 12, and an auxiliary battery 14. The structure of the engine compartment 20 will briefly be described with reference to FIG. 1. In the engine compartment 20 are provided a side member 15 that is provided on both sides of the hybrid vehicle 10 and is a vehicle frame member, a spring support 16 that is connected to the side member 15, a front bumper reinforcement 18 that is connected to tip ends of the side member 15, an engine 11, the motor case 12 that is connected to the engine 11, a wheel axle 25 that extends from the motor case 12, the PCU 13 that is fixed onto the motor case 12, the auxiliary battery 14 that is fixed by a fixture 22, a mounting base 21, and a support 23 onto the side member 15, and a radiator 17 that is attached to a front portion. Here, the PCU 13 is fixed by a bolt to the motor case 12, while the auxiliary battery 14 is configured to be able to move along the side member 15 in response to an impact load.

One characteristic of the vehicle equipment mounting structure according to this example embodiment is that the auxiliary battery 14 is connected to the side member 15 in such a way that a front end portion of the auxiliary battery 14 is farther toward a vehicle front side than a front end portion of the PCU 13 is. This kind of arrangement enables the PCU to be protected. Another characteristic is that the advancing direction of the auxiliary battery 14 that is smaller than the PCU 13 is defined by the fact that a side surface of the auxiliary battery 14 partially overlaps with a side surface of the PCU 13. Yet another characteristic is that the auxiliary battery 14 is configured to protect the PCU 13 by moving past it when an impact load is applied, by a portion of the auxiliary battery 14 being arranged next to a side of the PCU 13. In order to create this kind of configuration, in this example embodiment, innovations have been applied to both the mounting position of the auxiliary battery 14 and the support structure of the auxiliary battery 14.

Figure 2:
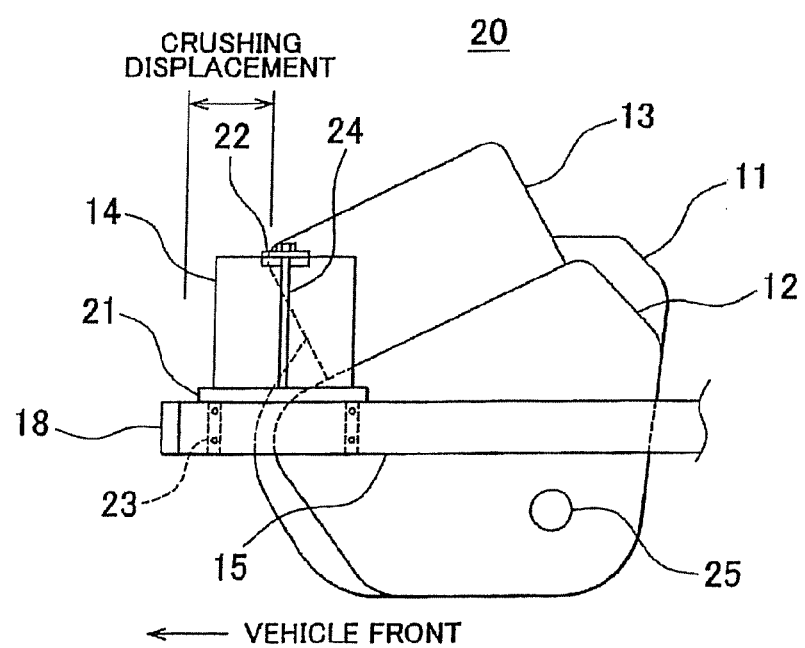
FIG. 2 is a side view of the engine compartment showing the vehicle equipment mounting structure according to the example embodiment of the invention.

FIG. 2 is a side view of FIG. 1, and shows the vehicle equipment mounting structure of the PCU 13 arranged on the upper surface of the motor case 12, and the auxiliary battery 14. The description related to the structure described with reference to FIG. 1 will be omitted. The auxiliary battery 14 is fixed onto the side member 15 by the support 23 that is fixed to the side member 15, the mounting base 21 that is mounted on top of the support 23, the fixture 22 that fixes the upper portion of the auxiliary battery 14, and a J-bolt 24 that fixes the fixture 22 to the support 23. The position in which the auxiliary battery 14 is fixed is farther toward the front of the vehicle than the PCU 13 by a distance that takes crush displacement length into account. As the crush displacement length, a distance is set at which a collision load can be sufficiently absorbed in conjunction with the crush displacement of the front bumper reinforcement 18, in response to the support 23 being crushed toward the rear of the vehicle without inhibiting the side member 15 from being crushed, when an impact load is applied.

Figure 3:
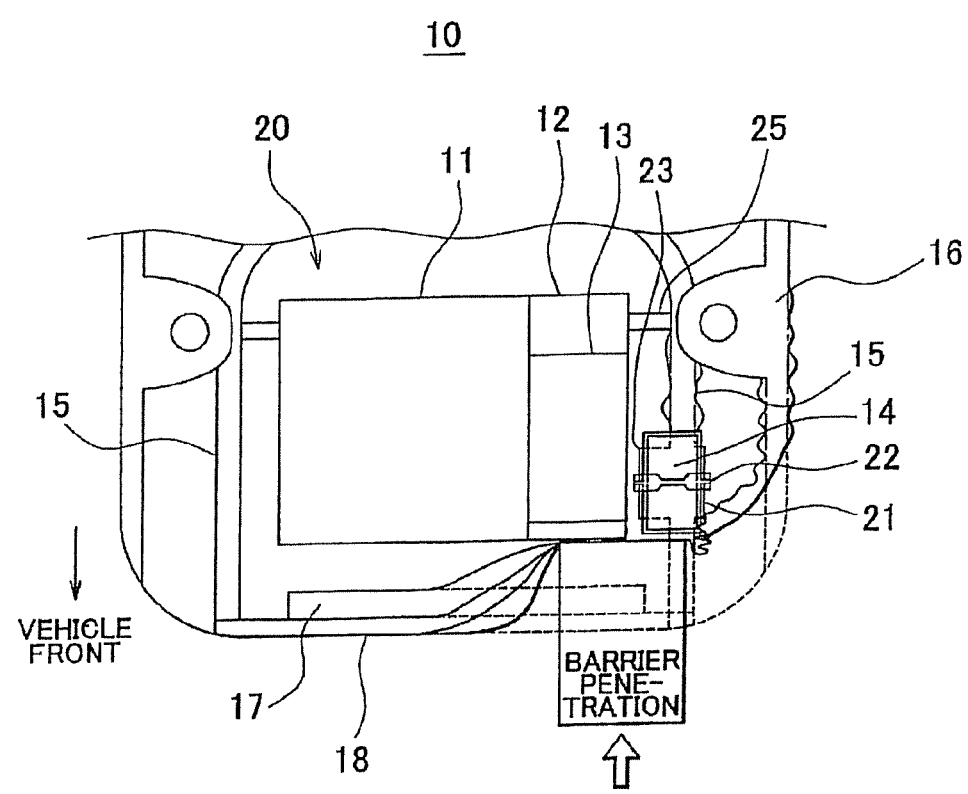
FIG. 3 is a view of a state in which a barrier has penetrated the engine compartment shown in FIG. 1.
Figure 4:
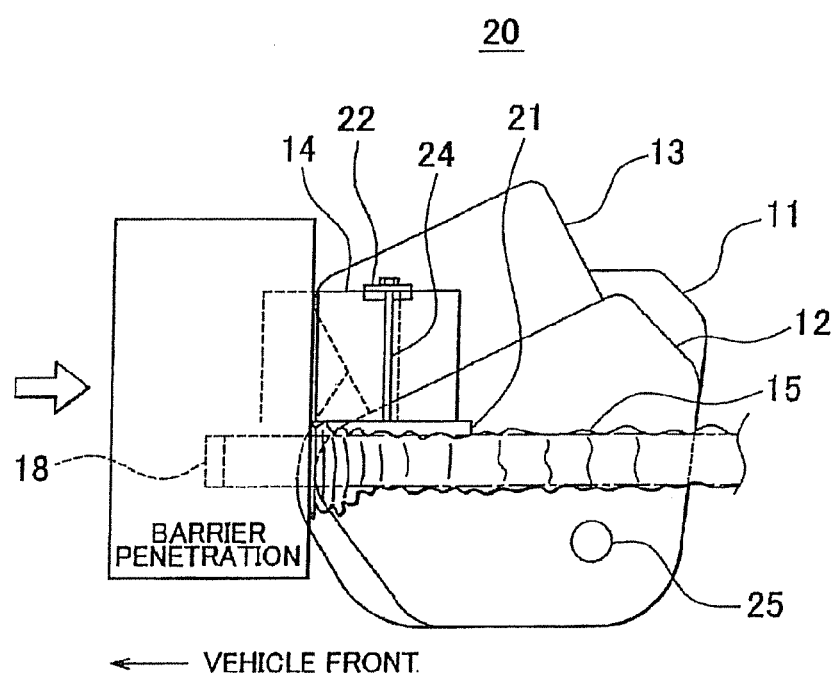
FIG. 4 is a view of a state in which the barrier has penetrated the engine compartment shown in FIG. 2.

FIG. 3 is a view of a frontal offset collision in which a barrier has penetrated the engine compartment 20 shown in FIG. 1, and FIG. 4 is a side view of the state shown in FIG. 3. As a result of the barrier penetrating the right half of the vehicle following an impact load, the front bumper reinforcement 18 and the radiator 17 are crushed first, and then the side member 15, a front apron, and the support 23 of the auxiliary battery are crushed. Then the barrier collides with the engine 11 or the motor case 12. As a result of this deformation and collision, the auxiliary battery 14 moves along the side of the PCU 13 to substantially the same position as the PCU 13, and as a result, a collision between the PCU 13 and the auxiliary battery 14 is able to be avoided. From this kind of sequential crushing, the impact load is able to be absorbed by the engine compartment 20 and the mounting equipment, so the PCU 13 can be protected and rapidly discharged. Next, the fixing structure of the auxiliary battery 14 will be described in detail.

Figure 5:
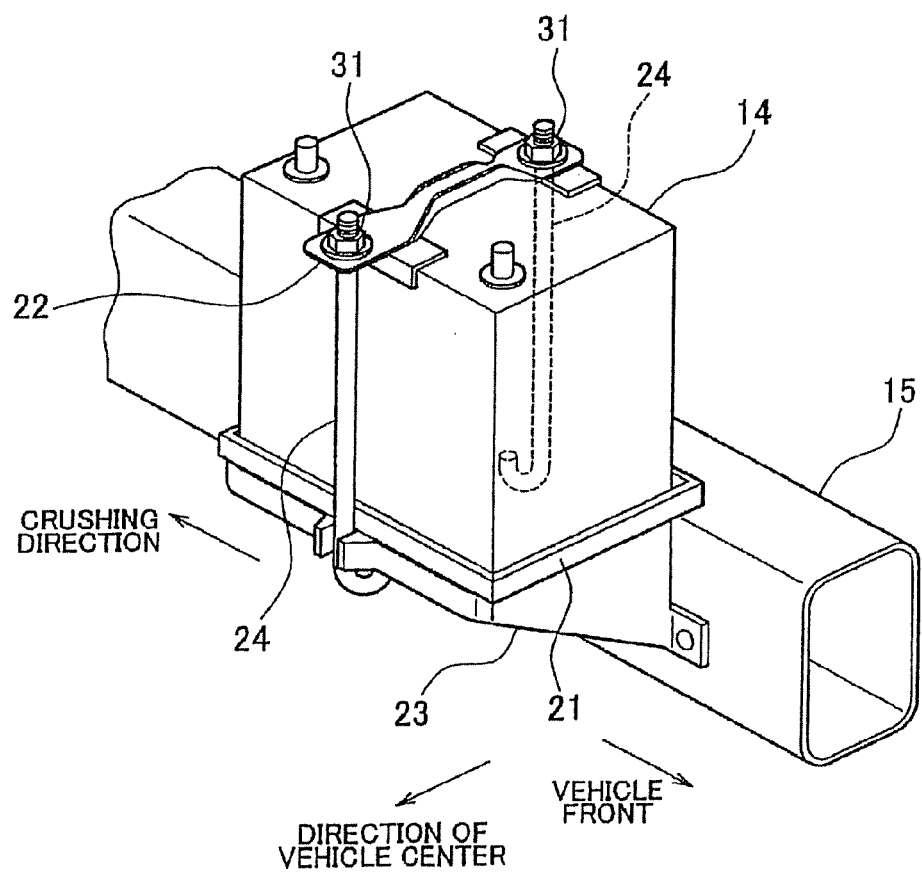
FIG. 5 is a perspective view of an auxiliary battery shown in FIG. 4.

FIG. 5 is a perspective view of the auxiliary battery 14 shown in FIG. 4. The auxiliary battery 14 is mounted on top of the support 23 that is fixed to a side member. The fixture 22 that fixes the auxiliary battery 14 is provided on the upper surface of the auxiliary battery 14. The fixture 22 is connected to the support 23 by two J-bolts 24 and nuts 31. The auxiliary battery 14 is fixed via the mounting base 21 on top of the support 23 by the fixture 22 and the two J-bolts 24 and nuts 31. Here, the support 23 has a structure that has the necessary strength in the vertical direction to support the weight of the auxiliary battery 14, but that will not inhibit the side member 15 from being crushed in the crushing direction. The fixture 22 and the two J-bolts 24 that hold the top surface of the auxiliary battery 14 have a structure that moves parallel to the crushing direction in response to deformation of the support 23 and deformation of the side member 15. Next, the structure of the support 23 will be described in detail.

Figure 6:
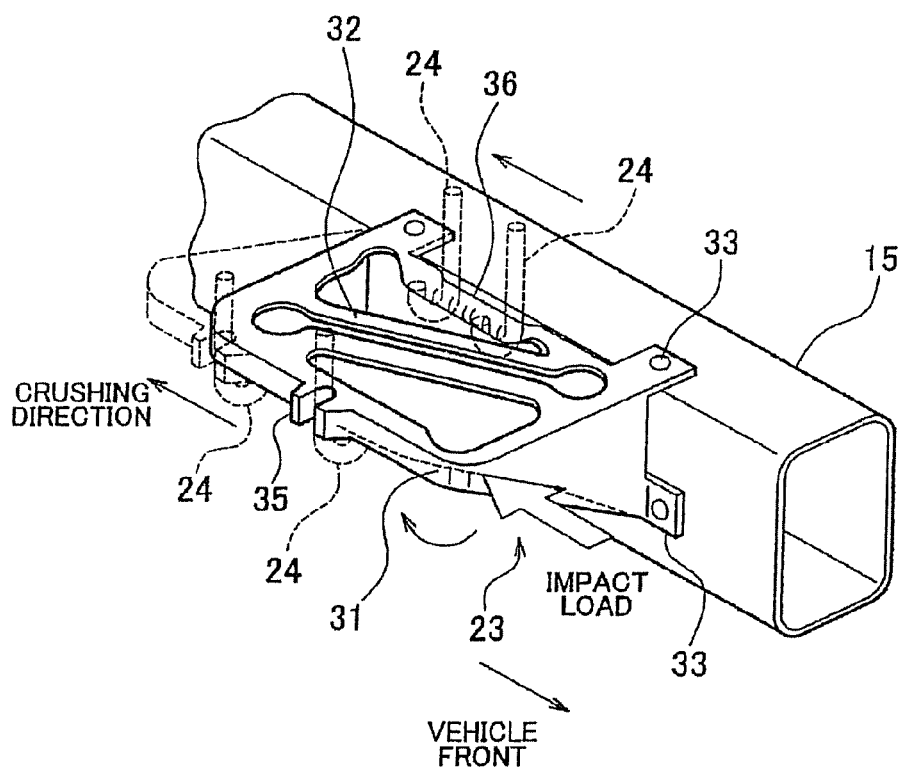
FIG. 6 is a perspective view of a support that supports the auxiliary battery shown in FIG. 5.

FIG. 6 is a perspective view of the support 23 that supports the auxiliary battery shown in FIG. 5. The support 23 is fixed to the side surfaces of the side member 15 by fixing portions 33 in four locations. The support 23 is formed by press-forming a thin plate, and includes an expanding and contracting portion that expands and contracts such that a parallelogram is crushed in the longitudinal and parallel direction as the side member 15 is crushed when a collision load indicated by the large arrow in the drawing is applied, and an inhibiting portion 32 that is provided at opposing corners of the parallelogram so as to inhibit expansion and contraction of the expanding and contracting portion up to a predetermined load. The inhibiting portion 32 is designed to maintain the strength of the support 23. Vibration control and strength are able to be maintained by the inhibiting portion 32. Moreover, the inhibiting portion 32 allows the expanding and contracting portion to deform by being drawn out by a tensile load from an impact load and deforming until it breaks. At this time, the relative position of the J-bolts 24 that are retained by J-bolt retaining portions 35 moves in the crushing direction by the deformation of the expanding and contracting portion, and the J-bolts 24 on the opposite side move, sliding on a J-bolt moving portion 36, such that the auxiliary battery 14 moves in the crushing direction. In this way, the auxiliary battery 14 is able to move past the side of the PCU 13 by moving parallel to the crushing direction, without the orientation of the auxiliary battery 14 changing. Next, an example embodiment in which an auxiliary battery is arranged straddling a side member will be described in detail.

FIG. 7A is a perspective view of a support 26 that supports an auxiliary battery according to another example embodiment of the invention. FIG. 7B is a view of deformation of the support 26 when an impact load is applied. The support 26 shown in FIG. 7A is fixed straddling a side member 15 by fixing portions 34 at four locations, by four leg portions 27 and 28, a mounting surface 29 that is supported by the leg portions, and J-bolt retaining portions 35 and 37 formed on the mounting surface. Therefore, a protruding press-formed portion 37 is provided on each of the four leg portions such that the support 26 will crush relatively easily in the crushing direction when an impact load is applied. As a result, vibration control and strength are able to be maintained. With this kind of shape, the bent portions deform and the parallelogram expands and contracts in the longitudinal and vertical directions when an impact load is applied, as shown in FIG. 7B, thereby enabling the auxiliary battery to move in the crushing direction without changing the orientation of the auxiliary battery.

As described above, using the vehicle equipment mounting structure according to the example embodiment makes it possible to utilize the space in the engine compartment by having the power control apparatus arranged on the motor case, and have the auxiliary battery arranged on a side member of a vehicle frame member so that it partially overlaps in the vehicle longitudinal direction with the power control apparatus. Also, when there is a collision, the barrier penetrates the engine compartment while crushing the vehicle frame member and the support of the auxiliary battery. Consequently, the auxiliary battery moves past the power control apparatus such that the auxiliary battery does not interfere with the power control apparatus. As a result, the power control apparatus is able to be protected and can be rapidly discharged. It should be noted that the support illustrated in this example embodiment has the expanding and contracting portion, but the invention is not limited to this. That is, the support may also be configured to move along a guide groove on the side member.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A vehicle equipment mounting structure that arranges a motor case, in which a rotary electric machine that drives a vehicle is housed, in a compartment provided forward of a vehicle cabin, and that mounts a power control apparatus that controls the rotary electric machine, and an auxiliary battery that supplies electric power to a control portion of the power control apparatus, comprising:
  a fixing portion that fixes the power control apparatus onto the motor case; and
  a connecting portion that connects the auxiliary battery to a vehicle frame member that absorbs an impact load by being crushed in a crushing direction,
  wherein the connecting portion includes a displaceable member that is displaceable in the crushing direction; and the auxiliary battery is arranged on a vehicle front side of the power control apparatus such that the power control apparatus and the auxiliary battery partially overlap in the crushing direction, and the auxiliary battery is arranged so as to be able to move past the power control apparatus in response to the impact load.

2. The vehicle equipment mounting structure according to claim 1, wherein the connecting portion connects the auxiliary battery to the vehicle frame member such that a front end portion of the auxiliary battery is farther toward the vehicle front side than a front end portion of the power control apparatus is.

3. The vehicle equipment mounting structure according to claim 1, wherein a portion of the auxiliary battery is arranged by the connecting portion so as to be positioned next to a side of the power control apparatus.

4. The vehicle equipment mounting structure according to claim 1, wherein the connecting portion is able to move in the crushing direction by displacement of the displaceable member, and moves the auxiliary battery without inhibiting the vehicle frame member from being crushed by the impact load.

5. The vehicle equipment mounting structure according to claim 1, wherein the connecting portion is connected to the vehicle frame member by a displaceable member in at least two locations.

6. The vehicle equipment mounting structure according to claim 1, wherein the power control apparatus and the auxiliary battery are arranged in this order from a center in a vehicle width direction toward an outside in the vehicle width direction.

7. The vehicle equipment mounting structure according to claim 1, wherein the motor case is a double axis type transaxle with two rotary electric machines.

8. The vehicle equipment mounting structure according to claim 5, wherein the connecting portion includes a fixture provided on an upper surface of the battery that is connected to the displaceable member by at least one J-bolt and at least one nut.

9. The vehicle equipment mounting structure according to claim 8, wherein the auxiliary battery is fixed via a mounting base on top of the displaceable member and the at least one J-bolt and at least one nut.

10. The vehicle equipment mounting structure according to claim 8, wherein the fixture and at least one J-bolt move parallel to the crushing direction in response to deformation of the displaceable member in the crushing direction such that the auxiliary batter is able to move parallel to and past the PCU in the crushing direction.

11. The vehicle equipment mounting structure according to claim 5, wherein the displaceable member includes an expanding and a contracting portion that expands and contracts such that a parallelogram is crushed in a longitudinal and a parallel direction as the vehicle frame member is crushed when a collision load is applied, and an inhibiting portion that is provided at opposing corners of the parallelogram so as to inhibit expansion and contraction of the expanding and contracting portion up to a predetermined load.

12. The vehicle equipment mounting structure according to claim 5, wherein the displaceable member straddles the vehicle frame member.

13. The vehicle equipment mounting structure according to claim 5, wherein the displaceable member includes a plurality of mounting legs and a mounting surface supported by the mounting legs.

14. The vehicle equipment mounting structure according to claim 13, wherein at least one J-bolt retaining portion is formed on the mounting surface.

* * * * *